(No Model.) 2 Sheets—Sheet 1.
J. W. HELLWIG.
SUPPORT FOR BICYCLES.
No. 549,917. Patented Nov. 19, 1895.
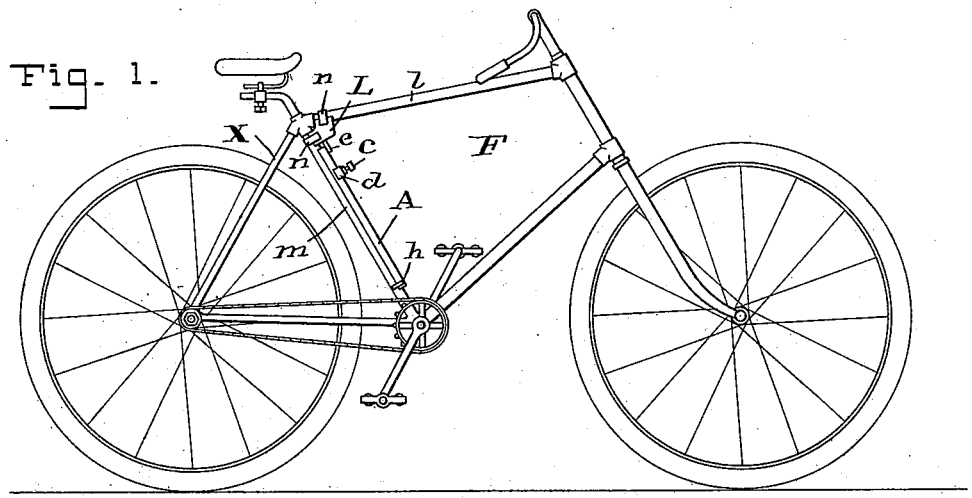
Fig. 1.
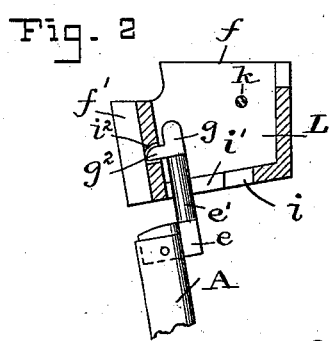
Fig. 2.
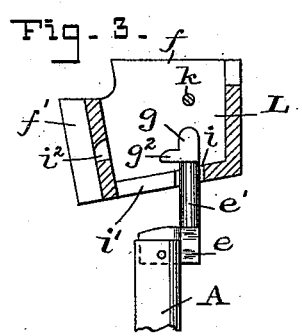
Fig. 3.
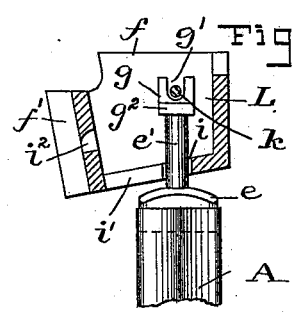
Fig. 4.
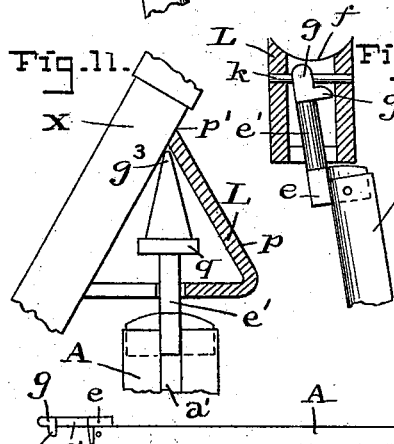
Fig. 11. Fig. 5.
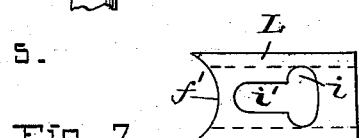
Fig. 7.
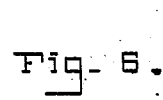
Fig. 6.
Fig. 8.
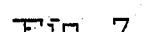
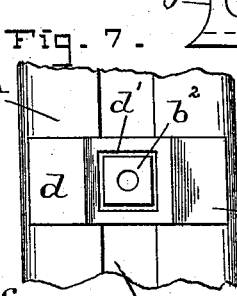
Fig. 9.
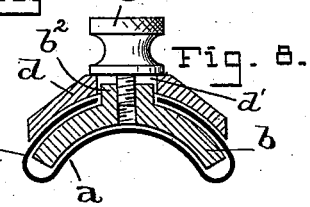
Fig. 10.
WITNESSES:—
L. I. Van Horn.
Charles B. Mann Jr.
INVENTOR:—
J. W. Hellwig
By Chas. B. Mann
ATTORNEY.
ANDREW B.GRAHAM. PHOTO-LITHO. WASHINGTON.D.C.

(No Model.) 2 Sheets—Sheet 2.
J. W. HELLWIG.
SUPPORT FOR BICYCLES.
No. 549,917. Patented Nov. 19, 1895.
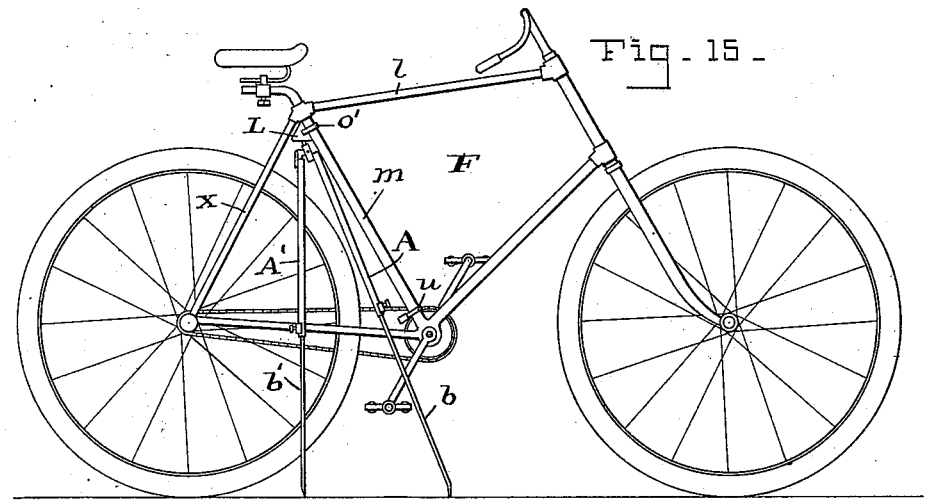
Fig. 15.
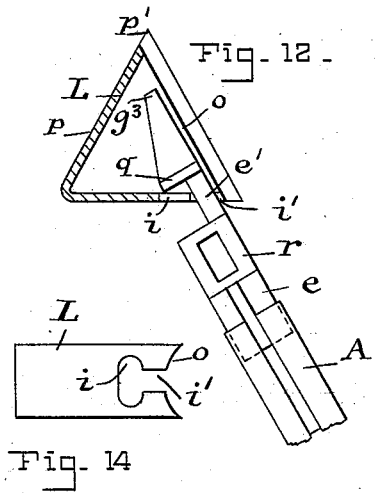
Fig. 12.
Fig. 14.
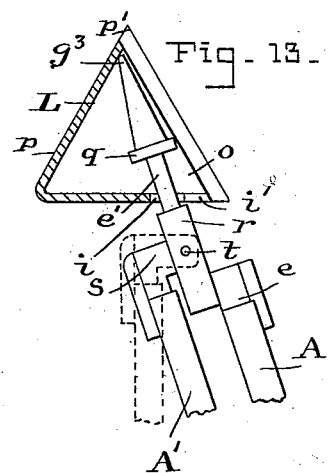
Fig. 13.
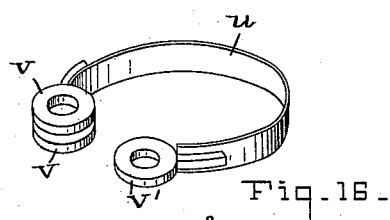
Fig. 16.
WITNESSES:
L. I. Van Horn.
Charles B. Mann Jr.
INVENTOR:
J. W. Hellwig
By Chas. B. Mann
ATTORNEY.

UNITED STATES PATENT OFFICE.

JUSTUS W. HELLWIG, OF BALTIMORE, MARYLAND.

SUPPORT FOR BICYCLES.

SPECIFICATION forming part of Letters Patent No. 549,917, dated November 19, 1895.

Application filed July 26, 1894. Serial No. 518,617. (No model.)

*To all whom it may concern:*

Be it known that I, JUSTUS W. HELLWIG, a citizen of the United States, residing at Baltimore, in the State of Maryland, have invented certain new and useful Improvements in Supports for Bicycles, of which the following is a specification.

This invention relates to certain new and useful improvements in devices to support a bicycle in an upright position when no rider is mounted on it.

The object of the invention is to provide a support which combines improved means whereby it may be readily adjusted from one side to the other of the bicycle and held from movement in either position, so as to sustain the bicycle in an upright position and which when not in use may be compactly folded and closely secured to one of the bars of the bicycle-frame.

The invention is illustrated in the accompanying drawings, in which—

Figure 1 is a side elevation of a bicycle embodying one form of my invention. Figs. 2, 3, 4, and 5 are sectional views showing the joint-casing and the locking-head coacting therewith. Fig. 6 is a bottom plan view of the joint-casing. Fig. 7 is a side view, enlarged scale, of a portion of the extensible support shown in Fig. 1. Fig. 8 is a cross-section of the same, showing the clamp. Fig. 9 is a view of the support shown in Fig. 1 detached and in an extended position. Fig. 10 is a perspective view showing one form of spring-clip at the bottom end of the extensible support. Figs. 11, 12, and 13 are modifications of the shell-casing and locking-head. Fig. 14 is a bottom plan view of the modified shell-casing. Fig. 15 is a side elevation of a bicycle, showing the support provided with two extension-rods instead of one, same as in Figs. 12 and 13. Fig. 16 is a perspective view of an improved clip to hold the lower ends of the support and a bolt which connects the two ends of the support.

My invention includes an extensible support, a joint-casing secured on the frame of the bicycle, and a locking-head on the extensible support which coacts with the said casing to effect two important results: first, to permit the free end of the support to be adjusted crosswise, so as to project the extension-rod of the support on either side of the bicycle, and, second, while the support is in this position and sustaining the bicycle to have the joint-casing hold the support rigidly against lateral or longitudinal movement or shifting.

In the accompanying drawings, A designates the extensible support, which, in Figs. 1 and 9, comprises a shell which in cross-section is semicircular in shape, as at $a$, and has on its convex side a vertical slot $a'$. A rod $b$, of wood or metal, slides in the shell and has a lateral head $b^2$ projecting into the slot. The rod is extensibly adjustable by means of a set-screw $c$. An exterior clamp-bar $d$ is across the vertical slot and has a center hole $d'$, which fits around the lateral head $b^2$ of the extension-rod $b$, and the set-screw $c$ has its screw-shank passed loose and free through this center hole and into the said lateral head. The head of the set-screw acts on the clamp-bar to press it against the exterior of the shell at opposite sides of the slot and the screw-shank acts on the rod $b$ to draw it, and thus the rod is held at any desired point of adjustment. The upper end of the shell is closed by a plug $e$, which has a neck $e'$ projecting from the shell and is provided with a locking-head $g$, having a top notch or groove $g'$ and a lateral base-flange $g^2$ just below the groove and adjoining the neck. The bottom end of the shell has secured to it a spring-clip. This clip consists of a metal band $h$ across the convex side of the shell and over the slot $a'$. Rivets $h'$ through the band and through the edges on the two opposite sides of the slot serve to hold the parts firmly. The two projecting ends $h^2$ of the clip serve to grip the bicycle-frame, whereby the bottom end of the support is connected with the bicycle. A joint-case L incloses the head $g$, and is provided in its bottom with an opening in the form of a T-shaped slot $i$ $i'$, and the neck $e'$ of the locking-head passes through this opening.

The joint-case in the form shown in Figs. 2, 3, 4, 5, and 6 is a shell having an open concaved top $f$ and a concaved rear side $f'$, which has a cross-slot $i^2$. The shell may be made in two halves joined by a cross pin or bolt $k$; but whether the joint-case be made of a single piece or in halves this pin $k$, which coacts with the top notch $g'$ of the locking-head, will be employed. The open concaved top $f$ of the case fits snugly up against the backbone $l$ of the bicycle-frame F and the concave side $f'$ fits against the upright rod $m$, and the case is secured to these parts by suitable clips $n$, and when the rod of the support is closed up and not in use the shell-support hangs pendent from this case and its lower end is confined by the spring-clip $h^2$ engaging with the upright rod $m$.

The construction of the joint-case with open concaved sides, which fit up against the round rods of the bicycle-frame, is important, as the projecting walls of the case at each side of the opening take against opposite sides of the rod, and thereby prevent lateral movement of the case. It will be seen, therefore, that while the clips $n$ hold the case from sliding down on the rod the projecting concaved side walls referred to coact therewith to hold the case securely attached.

When it is desired to sustain the bicycle in an upright position, the clips $h^2$ are released from the upright rod $m$, the lower end of the shell-support is swung laterally away from the frame F to the desired side of the bicycle, the set-screw $c$ is loosened, and the rod $b$ extended from the shell-support until the lower end of the rod reaches the ground, whereupon the set-screw is tightened. This lateral adjustability of the support is accomplished through the peculiar construction of the case and the coaction therewith of the neck $e'$ and the locking-head $g$. The construction and arrangement are such that when the support is attached to the bicycle the slot $i$ in the case extends in a direction crosswise of the backbone $l$, and the support may be swung to the desired side of the bicycle by allowing the neck $e'$ to take in the end of the slot which lies in that direction. The second slot $i'$ extends rearwardly, and this permits the shell-support A when the extension-rod $b$ is closed up and not in use to be swung so that the concaved side of the shell A will closely fit against the rod $m$, and the clips $h^2$ will then engage the said rod. The cross-slot $i^2$ also coacts at this movement and insures that this may take place as said cross-slot $i^2$ receives the base-flange $g^2$ on the locking-head. Fig. 2 shows the base-flange $g^2$ in engagement with the cross-slot and Fig. 3 the position of the locking-head in its disengaged position.

In Fig. 4 the shell A and head $g$ are shown disposed in a position at right angles to that shown in Fig. 3 and in position for swinging the lower end of the shell-support laterally, so as to allow the neck $e'$ to take in either end of the cross-slot $i$ to project the lower end of the support on one side or the other of the bicycle. In this position of the support (see Figs. 4 and 5) the groove $g'$ of the head engages with the cross-pin $k$, and this insures that the support will be locked and held from turning, shifting, or twisting, and also from movement backward into the slot $i'$, and thus the bicycle will be sustained firmly in an upright position.

In Figs. 11, 12, and 13 I have shown a modified form of the joint-case and the locking-head having a construction that is equivalent, because the function of these parts is precisely the same as in the other form of joint-case and locking-head shown in Figs. 2, 3, 4, 5, and 6. In this modification the case L is triangular in form and has an open concaved side $o$, and the bottom of the case has a T-shaped slot $i\ i'$, the end $i'$ of which opens at the said concaved side. This open concaved side $o$ of the case fits snugly against and closely embraces the upright rod $m$ of the bicycle-frame, to which it is secured by a clip $o'$. The closed side $p$ of the joint-case and the side of rod form a corner-angle $p'$ at the top. The locking-head in this instance is cone-shaped or tapers to a point $g^3$ and has a base-flange $q$ adjoining the neck $e'$. When it is desired to set the support so that it will be held locked and kept from shifting, it is necessary to set the tapered or pointed end $g^3$ of the head up within the said corner-angle $p'$, while the neck $e'$ takes in one end or the other of the cross-slot $i$, as shown in Fig. 11.

Instead of employing a single extensible support it is obvious that I may employ two supports connected to one locking-head, which is in the joint-case, as shown in Figs. 12, 13, and 15. In this instance the neck $e'$ is connected to a block $r$, which is united to the plug $e$ in the upper end of the shell A. A second shell-support A' has at its upper end a lateral joint-tang $s$, which is jointed to this block $r$ by a pin $t$. Now when these two shell-supports are swung together over to the desired side of the bicycle-frame F the extension-rods $b\ b'$ of the two supports are extended or drawn down and both are pulled out or away from the bicycle, and thus will sustain the bicycle. It is necessary in this construction, as well as in that shown in Figs. 1, 9, and 10, to confine the lower ends of the supports to one of the rods of the bicycle-frame when the support is not in use; but it is desirable in this case to use a holder of slightly-different construction from that shown in said figures. To this end I provide a clip $u$, which encircles the lower end of the upright rod $m$ of the bicycle-frame. This clip is provided at one end with two horizontal coupling-eyes $v$, having a space between them. The other end of the clip has a single eye $v'$, which enters the space between the other two eyes, and a bolt $w$ passes down through the holes of all the eyes and secures the clip. This bolt has a head $w'$, provided with a conical socket $w^2$, in which the lower free ends of the extension-rods $b$ are received and retained.

In Fig. 11 a single extensible support A is shown connected with the triangular joint-case L instead of two extensible supports A A', as in Figs. 12 and 13. It is desirable in this case to attach the joint-case to the rear rod $x$ of the bicycle-frame F.

Having thus described my invention, what I claim as new, and desire to secure by Letters Patent, is—

1. In a support for bicycles, the combination of the extensible support having a neck, $e'$; a joint case having in its bottom a T-shaped slot, $i, i'$, one disposed at a right angle to the other, and a cross-pin, $k$, in said chamber; and a locking head, $g$, connected with the neck of the support and inclosed within the said case and provided with a notch or groove, $g^2$, coacting with the said cross-pin.

2. In a support for bicycles, the combination of the extensible support having a neck, $e'$; a joint case having in its bottom a T-shaped slot, $i, i'$, one disposed at a right angle to the other and a cross-slot, $i^2$, in one side, and a cross-pin, $k$, in said chamber; and a locking head, $g$, connected with the said neck and inclosed within the joint case and provided with a lateral lip, $g'$, and a notch or groove, $g^2$, coacting with said cross-slot and cross-pin.

3. In a support for bicycles, the combination of the frame of a bicycle; a support attached by its upper end to the bicycle frame and comprising a shell, $a$, of semi-circular form in cross-section the concaved side of which is adapted to fit up close against a rod of the said frame and having on its convex side a longitudinal slot, $a'$, and an extensible rod sliding in the said shell; a set-screw, $c$, projecting through the slot and acting on the rod to draw it and hold it at any desired point of adjustment; and a metal band clip, $h$, at the bottom-end of the shell across the convex side and over the slot and secured at each side of the said vertical slot, whereby the shell is braced at this point,—the projecting spring ends of the clip serving to grip a rod of the said frame.

4. In a support for bicycles, the combination of the frame of a bicycle; a support attached by its upper end to the bicycle frame and comprising a shell, $a$, of semi-circular form in cross-section the concaved side of which is adapted to fit up close against a rod of the said frame and having on its convex side a longitudinal slot, $a'$, and an extensible rod sliding in the said shell; a set-screw, $c$, projecting through the slot and acting on the rod to draw it and hold it at any desired point of adjustment; and a holder to confine the lower end of the support to one of the rods of the frame when the said support is not in use.

5. In a support for bicycles, the combination of the frame of a bicycle; a support comprising a semi-circular shell $a$, upper end attached to the bicycle frame and open at its other end and having on its convex side a vertical slot, $a'$; a curved extension rod, $b$, fitting and sliding in the shell with its lower end projected through the said open end thereof, and the rod having at its upper end a lateral head projecting through said slot; a curved exterior clamp-bar, $d$, fitting loose over the said lateral head and across the convex side and over the said slot and bearing on the shell at opposite sides of the slot; and a set-screw, $c$, having its head pressed against the clamp-bar and its screw-shank extended into the lateral head of the said extension rod and acting to press the clamp-bar and draw the extension rod against the sides of the shell so as to hold the rod at any desired point of adjustment.

In testimony whereof I affix my signature in the presence of two witnesses.

JUSTUS W. HELLWIG.

Witnesses:
CHARLES B. MANN, Jr.,
C. CALVERT HINES.